United States Patent [19]

Stokman

[11] Patent Number: 5,938,005
[45] Date of Patent: Aug. 17, 1999

[54] SUPPORTING APPARATUS FOR A CONVEYOR BELT AND DUMPING POINT AND SELF-DISCHARGING TRANSPORT SHIP COMPRISING SUCH APPARATUS

[75] Inventor: Johannes Everardus Antonius Maria Stokman, Raamsdonksveer, Netherlands

[73] Assignee: J.E.A.M. Stockman Holding B.V., Netherlands

[21] Appl. No.: 08/809,854

[22] PCT Filed: Oct. 3, 1995

[86] PCT No.: PCT/NL95/00332

§ 371 Date: Jul. 21, 1997

§ 102(e) Date: Jul. 21, 1997

[87] PCT Pub. No.: WO96/10529

PCT Pub. Date: Apr. 11, 1996

[30] Foreign Application Priority Data

Oct. 3, 1994 [NL] Netherlands ............................ 9401624

[51] Int. Cl.[6] .................................................. B65G 15/08
[52] U.S. Cl. ............................................ 198/827; 198/825
[58] Field of Search .................................. 198/825, 827, 198/836.1, 837, 841

[56] References Cited

U.S. PATENT DOCUMENTS

| | | | |
|---|---|---|---|
| 3,200,940 | 8/1965 | Higgins et al. ........................ | 198/192 |
| 3,212,626 | 10/1965 | McLeish et al. ....................... | 198/192 |
| 3,880,275 | 4/1975 | Fischer et al. ......................... | 198/192 |
| 4,166,528 | 9/1979 | Renner .................................... | 198/827 |
| 5,350,053 | 9/1994 | Archer .................................... | 198/525 |

FOREIGN PATENT DOCUMENTS

| | | |
|---|---|---|
| 3643512 A1 | 6/1988 | Germany . |
| 296896 | 12/1991 | Germany ............................... 198/827 |
| 58025 | 8/1969 | Poland .................................... 198/827 |
| 890480 | 2/1962 | United Kingdom ................... 198/825 |

*Primary Examiner*—James R. Bidwell
*Attorney, Agent, or Firm*—Roberts & Mercanti, LLP

[57] ABSTRACT

An apparatus (1) for supporting and guiding a conveyor belt (2), comprising a series of supporting assemblies (9) arranged one behind the other, each supporting assembly (9) comprising at least two juxtaposed carrying axles (10), including an angle relative to each other, at least one of the carrying axles carrying a conveyor roller (15), whilst in each case, two carrying axles are interconnected by facing ends for pivoting at least in approximately the plane defined by the carrying axles (10) to form a garland-shaped supporting assembly (9) suspended by its free ends (13) in a supporting frame (5), at least a number of the supporting assemblies within the supporting frame being interconnected by connecting rods (18).

18 Claims, 4 Drawing Sheets

SUPPORTING APPARATUS FOR A CONVEYOR BELT AND DUMPING POINT AND SELF-DISCHARGING TRANSPORT SHIP COMPRISING SUCH APPARATUS

BACKGROUND OF THE INVENTION

The invention relates to an apparatus for supporting and guiding a conveyor belt.

For carrying conveyor belts for conveying bulk goods, a supporting apparatus comprising a series of supports is typically used, which supports each carry a number of juxtaposed conveyor rollers. For that purpose, each support has a series of fixed points of support, which in each case a carrying axle for a conveyor roller, which carrying axle is inserted from a top side, being bearing-mounted in two successive points of support. Preferably, the carrying axles include an angle relative to each other so that at that location, the conveyor belt is given a slightly troughed cross section.

This known supporting apparatus has the advantage that the conveyor belt is simultaneously supported properly and guided properly, because the conveyor rollers are capable of rotating around the carrying axles upon a conveying movement of the belt. However, the use of this supporting apparatus involves the drawback that contamination of the rollers, for instance due to bulk goods or dirt falling from the conveyor belt or carried along at the bottom side thereof and passed to the conveyor rollers, causes the conveyor rollers to become jammed in rotational sense. The material received by the conveyor rollers is collected on the support, for instance between the bearing surface of the conveyor roller and the support or in the bearing of the conveyor roller. If the conveyor roller is blocked in rotational sense, the conveyor belt will be drawn across the roller in a chafing manner during a conveying movement, causing strong wear of both the conveyor belt and the conveyor rollers. This may even result in tearing of the belt. Moreover, it thus becomes increasingly heavy to move the conveyor belt, which may cause the conveyor belt to slow down, resulting in loss of production and greater wear of, among other things, the drive means for the conveyor belt and an substantially greater necessary driving power.

In the event of undue wear of the conveyor rollers or if they are blocked, the relevant conveyor rollers should be disassembled and replaced or repaired. For that purpose, the conveyor belt should be stopped, the support should at least partly be disassembled and the conveyor roller should be removed in substantially vertical direction, i.e. in the direction of the conveyor belt to be supported. After that, another or the repaired conveyor roller can be placed back and the support can be brought into the operating position again. This manner of maintaining, repairing or replacing requires much time and skill, so that this is expensive and moreover requires a long production stop. In addition, with the known apparatus, such a replacement or repair should take place relatively often.

SUMMARY OF THE INVENTION

Therefore, the object of the present invention is to provide a supporting and guiding apparatus of the type described in the opening paragraph, wherein the advantages thereof are maintained and the drawbacks are avoided. To that end, there is provided an apparatus for supporting and guiding a conveyor belt. The apparatus comprises a series of supporting assemblies arranged one behind the other. Each supporting assembly comprises at least two juxtaposed carrying axles which include an angle relative to each other. At least one of the carrying axles carries a conveyor roller, characterized in that in each case, the two carrying axles are interconnected by facing ends for pivoting at least in approximately the plane defined by the carrying axles to form a garland-shaped supporting assembly. The supporting assembly is suspended by its free ends in a supporting frame and at least a number of the supporting assemblies within the supporting frame are interconnected by connecting rods or support rods, which are detachably connected with the supporting assemblies.

Because the carrying axles in each supporting assembly form a garland-shaped assembly, wherein the carrying axles are pivotally connected by their outer ends in a plane which, during use, extends approximately transversely to the longitudinal direction of the apparatus, and the garlands are suspended by their free ends in a supporting frame, no dirt can end up between the bearing faces of the conveyor rollers and a support in such a manner that the conveyor roller is blocked thereby in rotational sense. This cannot occur at a point of support either, since there is only a pivotable connection between the conveying axles. Moreover, because at least a number of the supporting assemblies within the supporting frame are interconnected by connecting rods, the garland-shaped assemblies within the supporting frame are prevented from moving to an undesired extent relative to one another in the conveying direction, in vertical direction or in transverse direction.

It is supposed that freely suspended garland-shaped assemblies involve the possibility that, in particular with strongly changing loads of the conveyor belt, the garland-shaped assemblies start swinging relative to one another and/or the supporting frame or are taken along by the conveyor belt and, as a consequence, strike against or across one another. This would irrevocably cause damage to the apparatus and the conveyor belt and, partly in consequence thereof, loss of production. The connecting rods prevent this in a simple yet effective manner.

With the assembly according to the invention, a garland-shaped assembly or a conveyor roller provided thereon can be replaced in a simple and fast manner. The garland-shaped assembly is detached from the supporting frame at least on one side thereof, after which it can be removed or pivoted in downward direction, in the direction away from the conveyor belt, after the connecting rod or rods has or have been detached. Then, a conveyor roller or the entire garland-shaped assembly can be replaced and put back. This only requires restoring the connection with the supporting frame and securing the connecting rod or rods on each relevant supporting assembly again.

In a preferred embodiment, the apparatus of the invention is characterized in that on the side of the supporting assembly facing the conveyor belt during use, the support rods are connected with a carrying axle included therein. The arrangement is such that during use, a loaded conveyor belt extending in the longitudinal direction across the series of supporting assemblies can be carried by the conveyor rollers and the support rods, and the garland-shaped supporting assemblies cannot pass the support rods in the vertical direction.

The support rods which are provided on the side of the supporting assembly facing the conveyor belt during use, and which are connected with a carrying axle included therein, together with the conveyor rollers form a suitable support for a conveyor belt to be supported and guided by the apparatus. The support rods can be disposed in such a manner that the conveyor belt, in unloaded condition, is substantially carried by the conveyor roll or rollers and in loaded condition also by the support rods. In this connection, the support rods have the advantage that owing to the interconnection, the garland-shaped support assemblies have only slight possibilities of movement relative to one another and in any rate cannot pass the support rods in vertical direction. As a result, at least locally, the conveyor belt is hardly liable to strong changes of shape and position during use, which prevents bulk goods located on the conveyor belt from being slung from the belt unintentionally, so that the environment is less burdened, relatively little or no load is lost and hence relatively little or no expense has to be made for clearing away any load dumped alongside the conveyor belt. Moreover, less contamination of, for instance, the conveyor rollers is involved, so that the wear is reduced as well.

Further advantageous embodiments of apparatuses according to the invention will be apparent to those of ordinary skill from reading the present specification.

The invention further relates to an assembly of an apparatus according to the invention and a conveyor belt of an at least partly troughed cross section, which assembly according to the invention is characterized in that a number of support rods together form a conveying face on which, during use, a portion of the conveyor belt is carried, with a lateral boundary extending at a distance from the conveying face and substantially parallel to the longitudinal axis of the apparatus, the lateral boundary connecting to the top side of the conveyor belt in such a manner that the conveyor belt is at least in substantially vertical direction confined between the lateral boundary and the opposite conveying face.

Because the conveyor belt is at least in substantially vertical direction confined between the lateral boundary and the opposite conveying face formed by the support rods, the possibilities of movement of the conveyor belt in a direction other than the conveying direction are limited considerably. This has the particular advantage that waste of load through conveyor belt movements are minimized, also if for instance load is dumped on the conveyor belt from a relatively great height. Moreover, the lateral boundary has the advantage that an amount of bulk goods dumped therebetween takes up a width so that at a flatter part connecting to the troughed part of the conveyor belt, the bulk goods distribute across the conveyor belt in such a manner that they will stay on the conveyor belt. This enables a maximum utilization of the conveying capacity of the conveyor belt without any waste of bulk goods.

In further elaboration, this assembly according to the invention is characterized the distance between the conveying face and the lateral boundary is slightly less than the thickness of the conveyor belt. The arrangement is such that the conveyor belt is pretensioned by the boundary in the direction of the conveying face.

As the space between the conveying face and the lateral boundary is slightly less than the thickness of the conveyor belt, the conveyor belt is pretensioned by the boundary in the direction of the conveying face. In other words, the conveyor belt is firmly pressed against the conveying face by the boundary. This limits the freedom of movement of the conveyor belt in a direction other than the conveying direction even further and, moreover, maintains the shape of the conveyor belt, defined by the series of support assemblies mutually coupled by the support rods, also in the case of intermittent loading of the conveyor belt.

The invention further relates to a dumping point for delivering from a dumping height bulk goods from a first conveying means to a subjacent conveyor belt, and to a self-discharging transport ship for bulk goods, having a hold included within the hull, which hold comprises outlet means at its lower side, with a conveyor belt provided between the outlet means and the hull of the ship for conveying bulk goods, dumped from the hold by the outlet means, at the lower side along the hold. The invention moreover relates to methods for disassembling and assembling an apparatus according to the invention.

BRIEF DESCRIPTION OF THE DRAWINGS

To explain the invention, exemplary embodiments and applications of an apparatus for supporting and guiding a conveyor belt will be described hereinafter with reference to the accompanying drawings, wherein.

DETAILED DESCRIPTION OF THE PREFERRED EMBODIMENT

Figure 1:
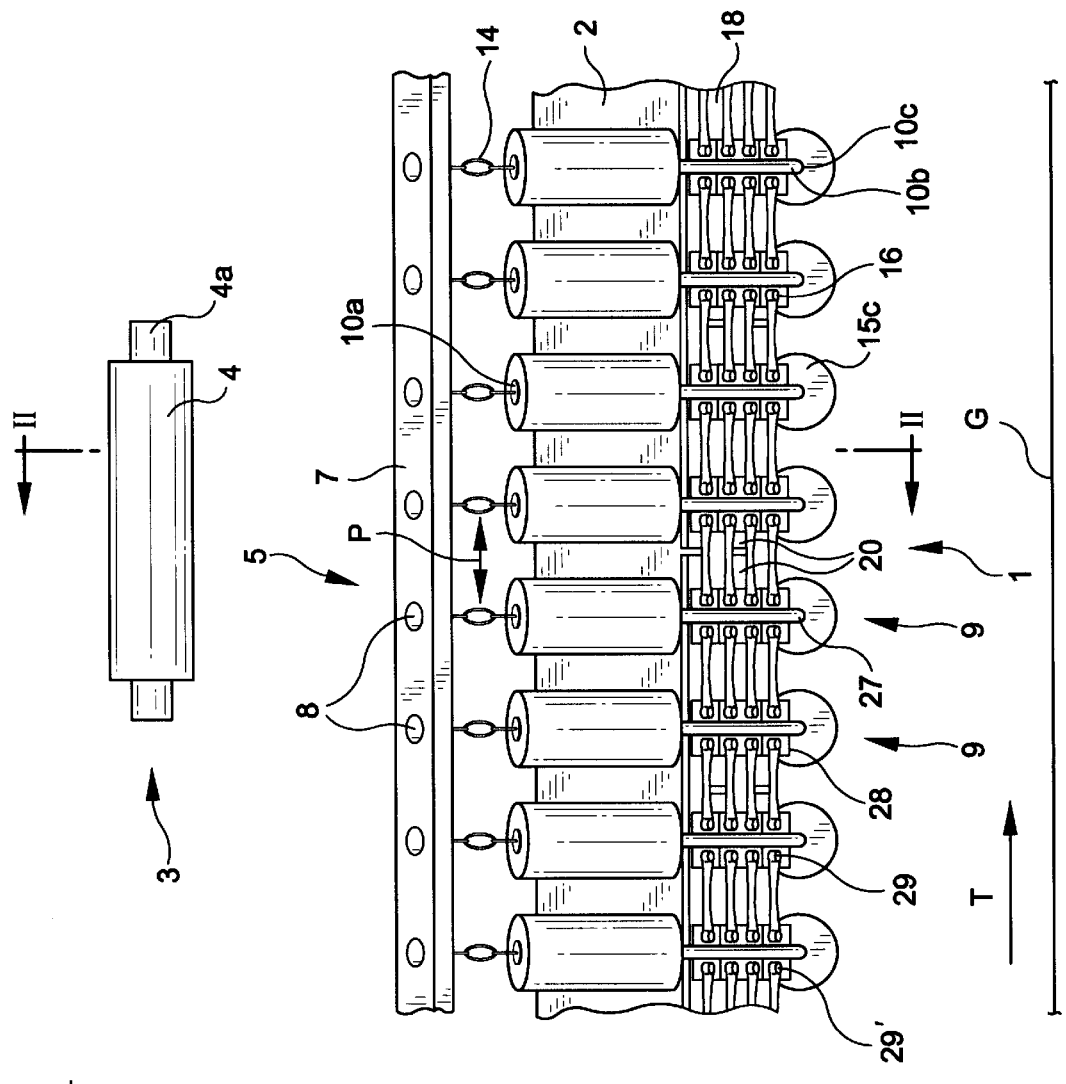
FIG. 1 is an elevational view of a portion of an apparatus according to the invention, included in a dumping point.
Figure 2:
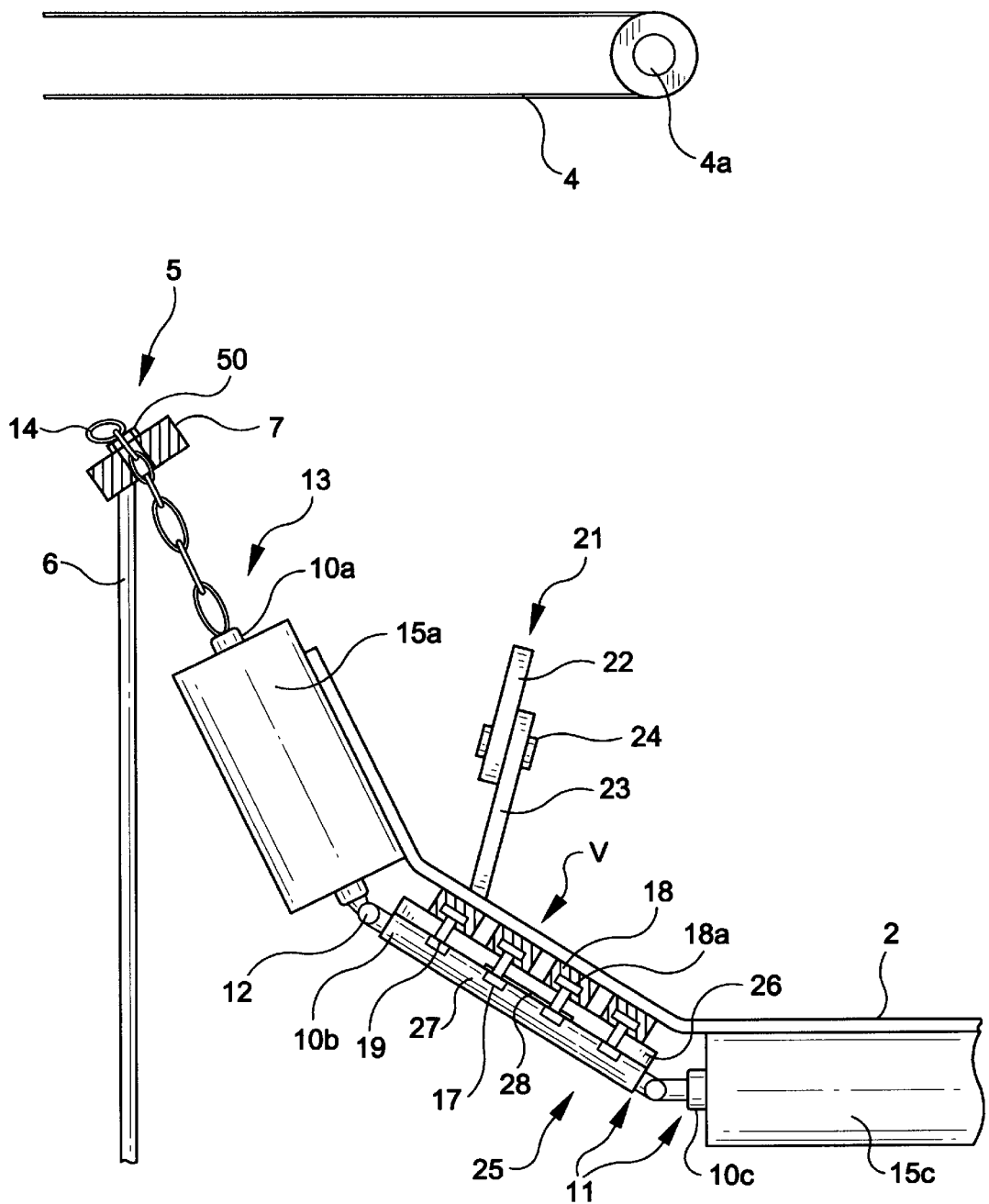
FIG. 2 is a cross-sectional view of the left-hand part of an apparatus according to the line II—II in FIG. 1.

FIGS. 1 and 2 show an apparatus according to the invention, included in a dumping or transfer point. The supporting apparatus 1 supports a conveyor belt 2 which has a troughed section. Located at a relatively great height above the conveyor belt 2 is a bulk goods delivery point 3, which in the drawing consists of a second conveyor belt 4 passed over a return roller 4a. Of course, this can also be a different means, such as for instance a differently oriented conveyor belt, a container, a gripper of a crane or a silo outlet. Moreover, the dumping height can be different or even practically absent.

The supporting apparatus 1 comprises a supporting frame 5, suitably supported by for instance a number of legs 6. The supporting frame 5 comprises two supports 7, disposed parallel and comprising through holes 8, provided at regular intervals, in such a manner that in each case, two holes 8 in opposite support 7 are in alignment.

Suspended between each pair of opposite holes 8 is a garland-shaped supporting assembly 9, which, for simplicity's sake, will hereinafter only be referred to by garland 9. In the embodiment shown in FIGS. 1 and 2, each garland 9 comprises five carrying axles, suspended in series and generally designated by 10, which are in each case interconnected via a pivot 12 for pivoting by two juxtaposed ends 11. Via a chain 14 or a like means, each free end 13 of the garland is suspended in an opening 8 in a manner to be further described hereinbelow. The pivots 12 are oriented substantially parallel to one another and to the conveying direction of the conveyor belt 2, indicated by arrow T, as a result of which the angle which the different carrying axles 10 can assume relative to one another can vary. Because the garlands 9 are suspended in the supporting frame 5 by chains 14, freely suspended garlands 9 can move relatively freely relative to one another both in the conveying direction P and transversely thereto.

The outer carrying axles 10a, i.e. the carrying axles closest to the supports 7, and the central, horizontally disposed carrying axle 10c each carry a conveyor roller 15a, 15c, rotatable about the carrying axle 10a, 10c respectively. In any case, the conveyor belt 2 is carried by these conveyor rollers. The central, first conveyor roller 15c is arranged at a distance above the ground G, in such a manner that material that may have been taken along by the conveyor belt 2 and/or the conveyor rollers 10 cannot accumulate between the conveyor rollers 10 and the ground G so that the conveyor rollers become blocked thereby in rotational sense. The returning part of the conveyor belt 2, not shown in the drawing, can extend in the space between the central conveyor roller 15c and the ground G. The intermediate carrying axles 10b are not provided with a conveyor roller but carry a conveying face V. The conveying face V is composed of a number of parallel spaced apart support rods 18.

Each intermediate carrying axle 10b is composed of a lower block 25 and an upper block 26. The lower block 25 comprises a rod-shaped body 27 and a rectangular plate 28. The plate 28 has a length which is approximately half the length of the body 27 and a width greater than the width of the body 27 and is centrally secured on the body 27. On both sides of the body 27, the plate 28, near the edges thereof, is provided with slotted holes 29 which extend at right angles to the longitudinal direction of the body 27 and which are open at their ends. At both ends 11, the body comprises receiving means for a pivot 12. The upper block 26 is plate-shaped, has a length substantially corresponding to the length of the body 27 and a width substantially corresponding to the width of the plate 28. The upper block 26 is at its bottom side provided with a central recess wherein the plate 28 is receivable such that the bottom side of the upper block 26 abuts against the top side of the body 27. On both sides of the center at the longitudinal sides of the upper block 26, the upper block is at regular distances provided with slotted holes 29', of which the central four slotted holes correspond to the slotted holes 29 in the plate 28. All slotted holes 29, 29' are identical in shape.

In assembled condition, the bottom side of the upper block 26 abuts against the top side of the body 27 and the plate 28. The central four slotted holes 29' lie over the slotted holes 29 in the plate 28. Extending in each case through the slotted holes 29, 29' is a fastening means, for instance in the form of a head bolt 17 whose head is received in a slotted recess 18a of a support rod 18. The height of the top face of each support rod 18 above the carrying axle 10b preferably approximately corresponds to the height of the conveyor rollers above the carrying axles, in such a manner that when a garland 9 is flattened, approximately a straight line is defined across the surface of the conveyor rollers 15 and the conveying face V.

On the side of the intermediate second carrying axles 10b facing the conveyor belt 2, the support rods 18 together extend along a number of, and preferably along all, garlands 9 arranged behind one another. On the side of the second carrying axles 10b facing away from the conveyor belt 2, the head bolts 17 are provided with securing means 19, such as for instance a nut or a quick-acting device, which is preferably removable from the head bolt 17 and the carrying axle 10b. As a result of the construction of the carrying axle 10b, the outer two support rods 18 are only mounted on the upper block 26, whereas the central two support rods 18 are mounted both on the upper block 26 and on the plate 28 and, accordingly, on the body 27. Hence, by the central four bolts 17 and securing means 19, the upper block 26 is at the same time mounted on the lower block 25. Due to this dividing possibility, assembly and disassembly can simply and safely be carried out in phases. Moreover, the bolts 17 can be slid into and out of the slotted holes 29, 29' via the open side by displacement of the head bolts 17 through the slotted recess 18a, as a result of which the assembly and disassembly are simplified even further.

By actuating a securing means 19, the relevant support rod 18 is fixedly drawn against the carrying axle 10b (at least against the upper block 26), so that it is mounted in a fixed position. By securing all support rods 18 on all relevant carrying axles in this manner, a troughed conveyor belt support freely suspended between the supports is obtained which is relatively form-retaining at least in the conveying direction T. Because the slotted recess 18a extends throughout the length of the support rods, a garland 9 can be fixed at any position along the support rods, enabling the mutual distance between the garlands 9 to be freely selected. However, the pivots 12 ensure that the conveyor support can change its shape in cross section by changing the angles included by the axles 10. In the conveying direction T, the garlands 9 can move relative to one another only to a very limited extent, because of the fixed, rigid connection by means of the support rods 18. Because the garlands 9 are chain-suspended, some movement of the whole is however possible.

In order that the assembling of long supporting apparatuses 1 does not require very long support rods 18, it is preferred that the support rods 18 are shorter than the entire apparatus and are "bonded", i.e. the facing ends 20 of two support rods 18 connected to each other in the longitudinal direction are located approximately at midlength of the or each adjacent support rod 18, between two successive garlands 9. Thus, a relatively form-retaining interconnection of the series of garlands can be obtained with relatively short rods 18.

Provided on the top side of the conveyor belt 2 above the conveying face V is a lateral boundary 21 which is adjustable in sideward direction and is for that purpose preferably connected to the supporting frame 5. The lateral boundary consists of a fixedly disposed supporting plate 22 and an apron 23 which is adjustable along the supporting plate and attached thereto for instance by means of set bolts 24 or the like. Preferably, the apron is pressed so far in the direction of the conveying face V that the conveyor belt 2 therebetween is slightly compressed. As a consequence, the conveyor belt 2 is practically no longer capable of coming loose from the conveying face. The lateral boundary is preferably disposed at an angle relative to the vertical, whilst the width between the two boundaries adjacent the carrier belt is greater than at the side remote therefrom. This yields a favourable dumping pattern and an advantageous distribution of the bulk goods across the conveyor belt.

The conveying assembly as shown in FIGS. 1 and 2 can be used as follows.

Bulk goods supplied by means of the second conveyor belt 4 are dumped on the subjacent first conveyor belt 2, moving in the conveying direction T, between the boundary 21 provided on two sides. The first conveyor belt 2 is carried by the first, horizontal conveyor roller 15c, the second, outer conveyor rollers 15a and by the conveying face V. Preferably, such an amount of bulk goods is dumped on the conveyor belt 2 that the entire space between the boundaries 21 is filled, enabling the maximum capacity of the conveyor belt 2 to be utilized without material being spilled.

With the conventional dumping points, the conveyor belt often comes loose from the supporting apparatus, in particular owing to a great dumping height, as a result of which material is lost, the belt cannot be utilized to the full, increased wear occurs and, moreover, there is the risk that the conveyor rollers come loose from the supports unintentionally, with all its consequences. With the apparatus according to the invention, this is prevented because the conveyor belt 2 is pressed against the relatively rigid conveying face V by the lateral boundary. This prevents wobbling of the conveyor belt 2 even in the case of sudden and changing loads. With the use of freely suspended garlands 9, connected by flexible means such as chains, relatively much freedom of movement is left, as a consequence of which the intended effect is achieved only partially. Moreover, this involves the risk that these means are provided or mended in a wrong manner, for instance after repair or replacement.

With an apparatus according to the invention, a garland 9 or a conveyor roller 15 can be replaced in a simple manner. For that purpose, only the securing means 19 of the relevant garland 9 need to be detached and removed and/or slid aside and the garland should be detached at least on one side of the supporting frame 5. Next, the garland 9 can be removed or swivelled away downwards. If so desired, the conveyor rollers 15 can then be inspected, cleaned, repaired, replaced and the like. After that, the assembling of the garlands takes place in reverse order.

As the garlands can readily be removed in the direction away from the conveyor belt 2, this requires only little time, while the conveyor belt 2 can remain in position and, as the occasion arises, can even continue running. Thus, maintenance of the conveying apparatus involves only a minimum loss of time and, accordingly, production. Moreover, because the support rods are bonded, the shape is retained when for instance one garland 9 is at least temporarily removed.

Preferably, the carrying axles 10 and conveyor rollers 15 are identical at least as far as construction is concerned, while the lengths may differ. Moreover, as far as construction is concerned, the carrying axles and conveyor rollers are preferably identical to carrying axles and conveyor rollers utilized in presently known supporting apparatuses. The advantage thus achieved is that the apparatus according to the invention can at least substantially be built up from existing components, while, moreover, it remains possible to adjust a known apparatus in the manner of the invention utilizing the components which are already present. This considerably limits the costs of such an apparatus and further simplifies the maintenance thereof.

Figure 3:
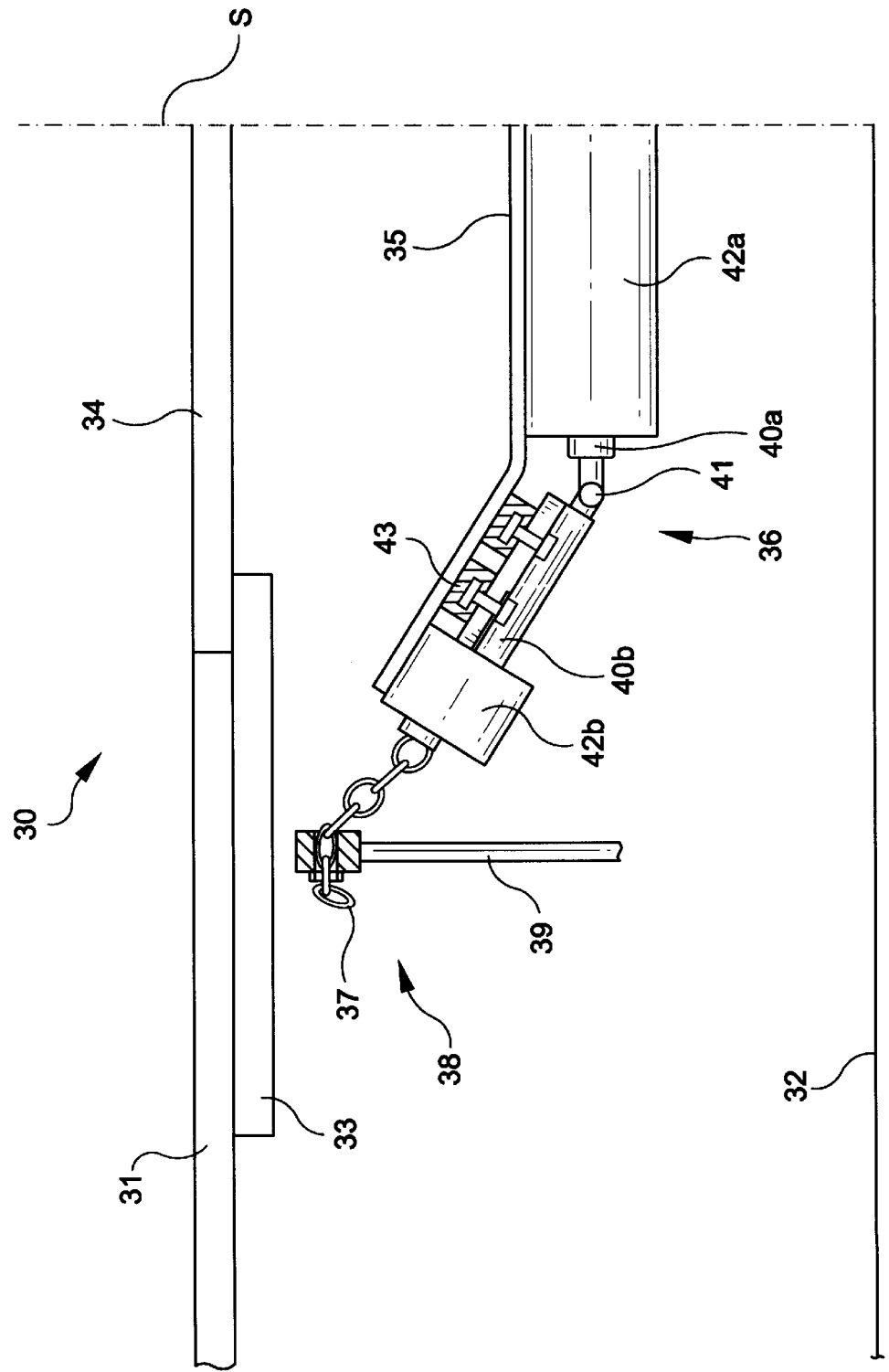
FIG. 3 schematically shows, in cross section, a left-hand bottom portion of a self-discharging transport ship for bulk goods.

FIG. 3 shows a portion of a cross section of a self-discharging transport ship comprising a conveyor belt 2 carried, adjacent the bottom side of the ship, by an apparatus according to the invention. In FIG. 3, only a portion of the left-hand half of the ship is schematically shown. At the right-hand side, this portion is bounded by a plane of symmetry shown in the drawing as a dash line S.

The ship comprises a hold 30 having a bottom 31 provided at some distance above the bottom plate or keel 32 of the ship. Provided in the bottom 31 of the hold is a central delivery opening 34, closable by means of, for instance, slides 33 or the like, below which delivery opening a conveyor belt 35 extends at a distance above the bottom plate 32 of the ship. The conveyor belt 35 has a troughed section and is carried by a series of garlands 36. By means of chains 37, the garlands 36 are suspended in the above-described manner in a supporting frame 38 which is fixedly connected to the ship via legs 39.

In the embodiment shown in FIG. 3, the garlands 36 comprise three carrying axles 40, interconnected by pivots 41 in the manner shown in FIGS. 1 and 2. The central, horizontally disposed carrying axle 40a carries a first conveyor roller 42a, extending substantially throughout the width of the carrying axle 40a. The outer, second carrying axles 40b, which include an angle with the first carrying axle 40a, carry a conveying face V and a second, relatively narrow conveyor roller 42b. In the manner described with reference to FIGS. 1 and 2, the conveying face V is built up of support rods 43, connected to the second carrying axles 40b in the manner described. These support rods 43, too, are preferably bonded.

The second conveyor roller 42b has a width of for instance one-third of the width of the carrying axle 40b, the conveying face has a width of two-thirds of the width of the carrying axle 40b. The central, first conveyor roller 42a lies at a distance above the bottom plate 32 of the ship such that dirt and the like cannot accumulate therebetween in such a manner that the conveyor roller can be blocked thereby in rotational sense. This prevents unnecessary, undue wear of in particular the conveyor rollers and the conveyor belt.

Because the supporting apparatus for the conveyor belt 35 is freely suspended within the supporting frame, maintenance of the conveying apparatus can be carried out in a very simple and little time-consuming manner, and, moreover, the apparatus can be of a relatively compact construction, so that only little installation space is occupied by the conveying apparatus, which is of benefit to the loading space of the ship.

Figure 4:
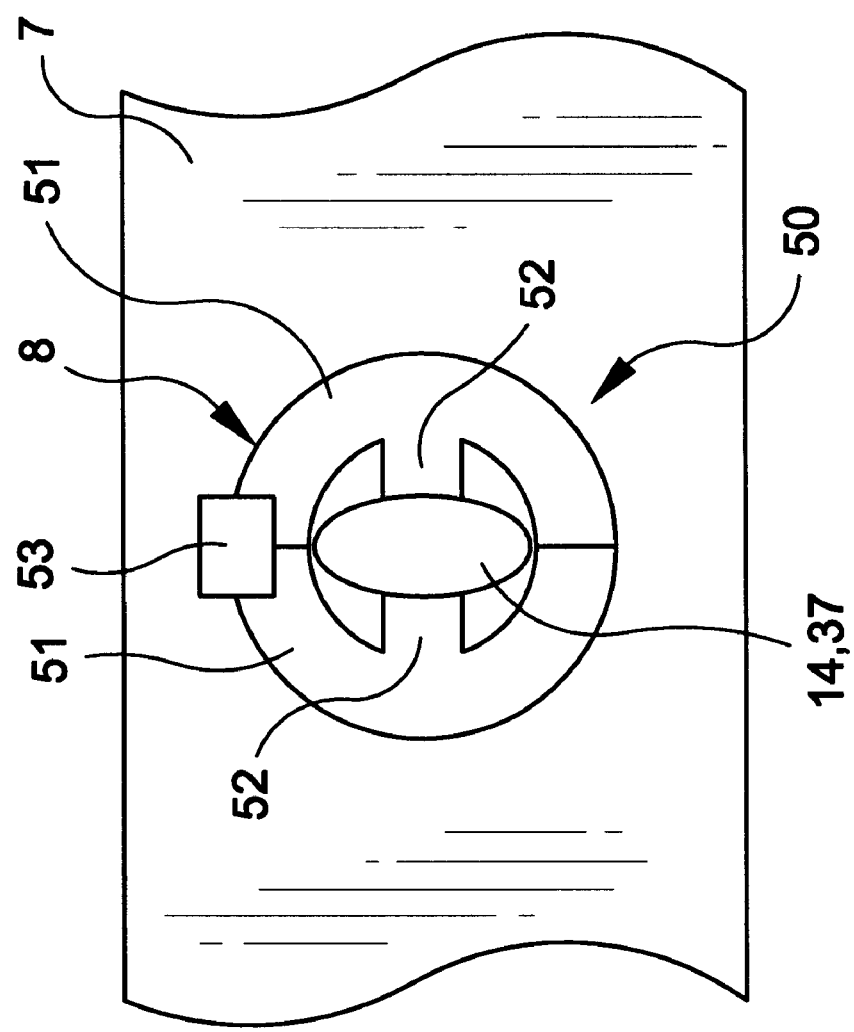
FIG. 4 is a front view of the suspension of a garland in the supporting frame.

In the manner shown in FIG. 4, the garlands 9, 36 are fastened in the holes 8 by means of fastening discs 50. Each disc 50 consists of two mirrored halves 51 which together form a ring and comprise a lip 52 extending into the opening defined by the ring. The ring fittingly beds down in a hole 8 so that it can only be removed in the direction away from the garland. There is further provided a closing lip 53, extending for instance slightly across the hole 8 from the top side thereof, so that a portion of a ring received in the opening is covered thereby.

By means of this apparatus, the garland 9, 36 can be fixed as follows.

By its free end, the chain 14, 37 is inserted into a suitable hole 8, so that at least one link extends at least partly outside the support 7. Then, by the lips 52, the two ring halves 51 are passed through a link extending outside the support and pressed together to form a closed ring with approximately continuous lips 52. Then, the thus formed fastening disc is slightly tilted relative to the plane of the hole so that it can pass the closing lip 53 and be pressed into the hole 8. Consequently, the fastening disc 50 is retained in the hole 8 and is drawn firmly into the hole by the garland 9, 36 suspended from the chain on the opposite side.

Because the closing lip 53 is provided, the fastening disc cannot be removed from the hole 8 in an untilted fashion. This has the advantage that also when the chain slackens, for instance during or after a very strong impulse-shaped loading of the relevant garland, the fastening disc 50 and accordingly the chain 14, 37 cannot come loose from the support. Hence, only a resolute act can release the garland from the supporting frame, while the assembling thereof is particularly simple. This manner of fastening moreover has the advantage that each link of the chain can be used for fastening, permitting the garland 9, 36 to be tensioned in a simple manner by means of these fastening discs 50.

The invention is by no means limited to the embodiments shown in the drawing and specification. Many modifications thereof are possible. For instance, a different number of carrying axles, conveyor rollers, conveying faces and support rods can be used, and the number of conveyor rollers per carrying axle and the number of support rods per conveying face can be selected differently. The carrying axle for the support rods can be formed in a different manner, for instance like the other carrying axles, while for instance U-shaped brackets can be used for fixing the support rods, or head bolts which extend through holes in the carrying axle. Moreover, the shape of the conveyor belt through the garlands can be defined differently, for instance flat or V-shaped, and the carrying axles can be interconnected by other, for instance flexible means. The conveying assembly can be designed with and without lateral boundary, on one or both sides of the center thereof, and can carry connecting rods which do not form part of a conveying face. Further, other means can be used for suspending the garlands, such as for instance bands or cables and clamping devices therefor. These and many other modifications are considered to fall within the purview of the invention.

I claim:

1. An apparatus for supporting and guiding a conveyor belt, comprising a series of supporting assemblies arranged one behind the other, each supporting assembly comprising at least two juxtaposed carrying axles including an angle relative to each other, at least one of the carrying axles carrying a conveyor roller characterized in that in each case, two carrying axles are interconnected by facing ends for pivoting at least in approximately the plane defined by the carrying axles to form a garland-shaped supporting assembly suspended by its free ends in a supporting frame, at least a number of the supporting assemblies within the supporting frame are interconnected by connecting support rods, which are detachably connected with the supporting assemblies.

2. An apparatus according to claim 1, characterized in that on the side of the supporting assembly facing the conveyor belt during use, the support rods are connected with a carrying axle included therein, the arrangement being such that during use, a loaded conveyor belt extending in the longitudinal direction across the series of supporting assemblies can be carried by the conveyor rollers and the support rods, and the garland-shaped supporting assemblies cannot pass the support rods in vertical direction.

3. An apparatus according to claim 1, characterized in that the support rods extend substantially parallel to the longitudinal axis of the apparatus transversely to the garland-shaped supporting assembles.

4. An apparatus according to claim 1, characterized in that connecting rods extend on both sides of the longitudinal axis of the apparatus.

5. An apparatus according to claim 4, characterized in that each supporting assembly comprises an uneven number of carrying axles, at least the central carrying axle carrying a conveyor roller and a second carrying axle being provided on both sides of the central carrying axle comprising receiving means for at least one support rod.

6. An apparatus according to claim 5, characterized in that each receiving means comprises at least one pin extending through the carrying axle, which pin is at one end attachable to or in a connecting rod and at the other end comprises removable retaining means for rigidly connecting the pin to the carrying axle, the carrying axle being removable from the pin when the retaining means have been removed.

7. An apparatus according to claim 5, characterized in that the carrying axle of the conveyor roller is approximately horizontally disposed and the second carrying axles include an angle relative to each other.

8. An apparatus according to claim 5, characterized in that extending on the side of each second carrying axle remote from the central conveyor roller is a second conveyor roller.

9. An apparatus according to claim 8, characterized in that each second conveyor roller is provided on a third carrying axle which is pivotally connected to the second carrying axle.

10. An apparatus according to claim 8, characterized in that each second conveyor roller is bearing-mounted on a second carrying axle.

11. An apparatus according to claim 1, characterized in that at least three supporting assemblies are provided, along which a series of parallel support rods extend, the support rods being bonded so that substantially all supporting assemblies are interconnected thereby.

12. An assembly of an apparatus according to claim 2 and a conveyor belt having an at least partly troughed cross section, characterized in that a number of support rods together form a conveying face on which, during use, a portion of the conveyor belt is carried, with a lateral boundary extending at a distance from the conveying face and substantially parallel to the longitudinal axis of the apparatus said lateral boundary connecting to the top side of the conveyor belt in such a manner that the conveyor belt is at least in substantially vertical direction confined between the lateral boundary and the opposite conveying face.

13. An assembly according to claim 12, characterized in that the distance between the conveying face and the lateral boundary is slightly less than the thickness of the conveyor belt the arrangement being such that the conveyor belt is pretensioned by the boundary in the direction of the conveying face.

14. A supporting assembly for use in an apparatus according to claim 1, said supporting assembly comprising at least two carrying axles interconnected by facing ends for pivoting at least in approximately the plane defined by said carrying axles, such that the supporting assembly is garland shaped, and at least one of said carrying axles carrying a conveyor roller.

15. A dumping point for delivering from a dumping height bulk goods from a first conveying means to a subjacent conveyor belt, the subjacent conveyor belt being supported by an apparatus according to claim 1.

16. A self-discharging transport ship for bulk goods, comprising a hold accommodated within the hull, which hold has its bottom side provided with outlet means, a conveyor belt being provided between the outlet means and the hull of the ship for conveying, at the bottom side along the hold, bulk goods dumped from the hold by the outlet means, the conveyor belt being supported by an apparatus according to claim 1.

17. A method for disassembling an apparatus according to claim 1, characterized in that during disassembling, all connecting rods of at least one garland-shaped supporting assembly are detached, whereupon the garland-shaped assembly is detached from the supporting frame and removed downwards and/or sidewards, whereupon, if necessary, conveyor rollers located thereon can be repared and/or replaced and the garland-shaped assembly can be placed back.

18. A method for assembling an apparatus according to claim 1, characterized in that at least two garland-shaped assemblies are connected by their ends to the supporting frame, whereupon a number of support rods are coupled thereto, whereupon adjacent garland-shaped supporting assemblies are then suspended in the supporting frame and coupled to the relevant support rods, in such a manner that each support rod that is provided is supported by at least two garland-shaped supporting assemblies.

* * * * *